(12) United States Patent
Bryl et al.

(10) Patent No.: US 8,191,701 B2
(45) Date of Patent: Jun. 5, 2012

(54) BELT CLEANING SYSTEM FOR LASER CUTTING DEVICE

(75) Inventors: Derek A. Bryl, Webster, NY (US);
Richard P. Ficarra, Williamson, NY (US); Gordon B. Reid, Walworth, NY (US); Thomas C. McGraw, Macedon, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/902,637

(22) Filed: Oct. 12, 2010

(65) Prior Publication Data

US 2012/0085622 A1   Apr. 12, 2012

(51) Int. Cl.
*B65G 45/22* (2006.01)
(52) U.S. Cl. ....................................................... 198/495
(58) Field of Classification Search .................. 198/495
See application file for complete search history.

(56) References Cited

U.S. PATENT DOCUMENTS

| 3,046,771 | A | * | 7/1962 | Bailey | 198/495 |
| 3,583,555 | A | * | 6/1971 | Karsnak et al. | 198/495 |
| 4,073,376 | A | * | 2/1978 | Krooss | 198/495 |
| 4,860,883 | A | * | 8/1989 | Knaul et al. | 198/495 |
| 4,960,200 | A | * | 10/1990 | Pierce | 198/495 |
| 6,533,102 | B2 | * | 3/2003 | Franzoni et al. | 198/495 |
| 6,945,383 | B2 | * | 9/2005 | Pham | 198/495 |
| 6,971,503 | B2 | * | 12/2005 | Thompson | 198/495 |

* cited by examiner

*Primary Examiner* — James R Bidwell
(74) *Attorney, Agent, or Firm* — Alix, Yale & Ristas, LLP

(57) ABSTRACT

A belt cleaning system to clean the carrier surface of a conveyor belt. The system includes a roller assembly and a liquid supply subsystem. The roller assembly includes a cleaning web composed of a hydroscopic material and a roller to bias the cleaning web into rotating contact with the conveyor belt carrier surface. The liquid supply subsystem provides a cleaning liquid to the cleaning web.

16 Claims, 3 Drawing Sheets

BELT CLEANING SYSTEM FOR LASER CUTTING DEVICE

BACKGROUND

This disclosure relates generally to apparatus for laser cutting of paper. More particularly, the present disclosure relates to conveyor belts used to transport paper articles to and from a laser cutting device.

Paper debris and contamination build up on the laser cutting vacuum transport belt. The laser heats up the debris on following passes which in turn bakes the debris onto the transport belt, the baked-on debris absorbing extra energy, warping the belt, burning through the belt, and causing the belt causing to fail prematurely.

A conventional approach to solving this problem is to clean the belt periodically by hand or with a mechanical activated scraper blade while the machine is running. However, the debris builds up between cleansing, the belt warps, becomes tacky, and documents become difficult to remove.

If scraped: 1) debris builds up on the scraping edge of the blade, reducing the effectiveness of the blade; 2) the blade scratches the belt, making it more difficult to remove the contamination; and 3) the blade cannot access the warped areas of the transport belt. If hand cleaned, both the cleaning solution and debris get pulled through the vacuum holes and migrate to the underside of the belt, which in turn can cause drive problems and more belt failures.

SUMMARY

There is provided a belt cleaning system to clean a conveyor belt having a carrier surface. The system comprises a roller assembly and a liquid supply subsystem. The roller assembly includes a cleaning web comprising a hydroscopic material and a roller to bias the cleaning web into rotating contact with the conveyor belt carrier surface. The liquid supply subsystem provides a cleaning liquid to the cleaning web.

The roller may be a cylinder comprising a porous material, with the cleaning web being a roll of cleaning fibers wrapped around the outer surface of the roller.

The belt cleaning system may further comprise a drive system to rotate the roller and cleaning web.

The liquid supply subsystem may be in fluid communication with the roller inner cavity, with the cleaning liquid traveling through roller to wet the cleaning web.

The liquid supply subsystem may include a cleaning liquid reservoir and a supply line connecting the reservoir and the roller inner cavity. A pump may be disposed in the supply line and may provide an excess cleaning liquid flow to push debris embedded within the roll of cleaning fiber to an outer surface of the cleaning web.

The liquid supply subsystem may also include a sump disposed below the roller assembly and a filter in fluid communication with the sump and the reservoir.

The liquid supply subsystem may include a cleaning liquid reservoir to contain the cleaning liquid, with the cleaning web being a continuous loop having proximal and distal end portions. The roller is disposed in the proximal end portion of the cleaning web loop and the distal end portion of the cleaning web loop is disposed in the cleaning liquid reservoir.

The liquid supply subsystem may also include a cleaning device disposed in the cleaning liquid reservoir to remove debris from the cleaning web.

The liquid supply subsystem may further include a pump and a filter in fluid communication with the cleaning liquid reservoir, with the pump pumping a flow of the cleaning liquid through the filter to remove debris from the cleaning liquid.

The belt cleaning system may further comprise a reservoir level control system including a reservoir liquid level detector, a flow control device and a controller in communication with the reservoir liquid level detector and the flow control device. The controller operates the flow control device to fill the reservoir when the cleaning liquid in the reservoir falls to a predetermined level.

BRIEF DESCRIPTION OF THE DRAWINGS

The present disclosure may be better understood and its numerous objects and advantages will become apparent to those skilled in the art by reference to the accompanying drawings in which.

DETAILED DESCRIPTION

With reference to the drawings wherein like numerals represent like parts throughout the several figures, a belt cleaning system in accordance with the present disclosure is generally designated by the numeral 10. The belt cleaning system 10 may be used for cleaning the web of a conveyor belt, for example a conveyor belt for transporting articles to and from a laser cutting device.

Figure 1:
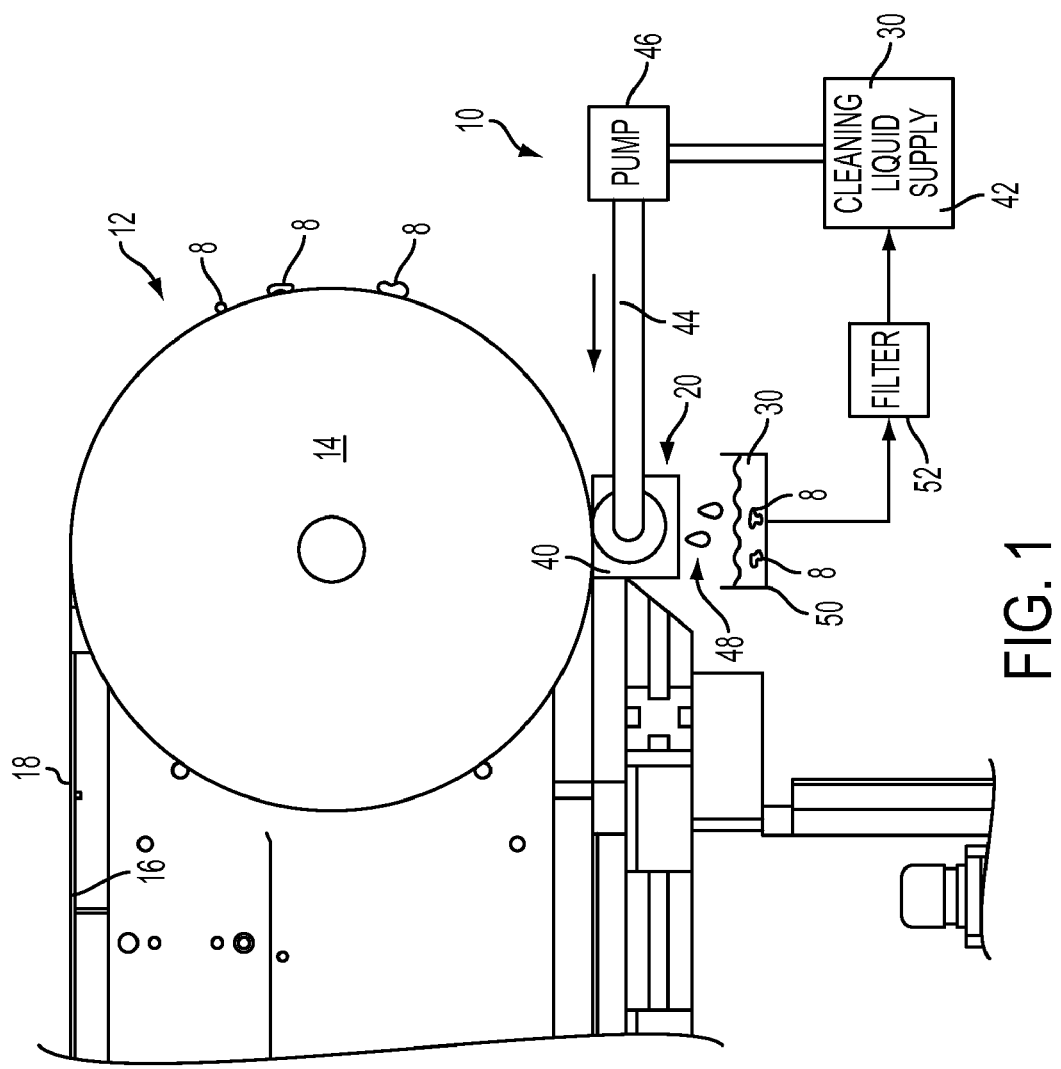
FIG. 1 is a schematic view of a first embodiment of a belt cleaning system in accordance with the present disclosure installed on a conveyor.

Referring first to FIG. 1, a conveyor 12 includes a nose roller 14 about which is wrapped a conveyor belt 16 or web. Positioned closely adjacent the periphery of the conveyor belt 16 is a first embodiment of the belt cleaning system 10 which spans the width of the belt 16. The belt cleaning system 10 substantially continuously cleans the conveyor belt 16, thereby preventing debris 8 from accumulating on the carrier surface 18 of the conveyor belt 16 and removing the debris 8 before it can reach the laser area (not shown). The clean belt surface 18 reflects the laser, preventing laser induced etching and warping found in conventional systems and thereby extending the life of the conveyor belt 16.

Figure 2:
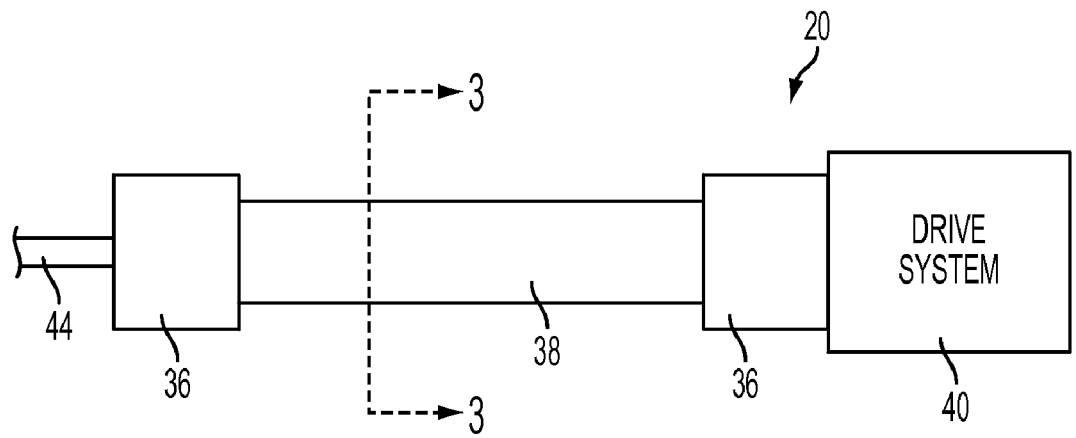
FIG. 2 is an enlarged front view of the roller assembly of FIG. 1.
Figure 3:
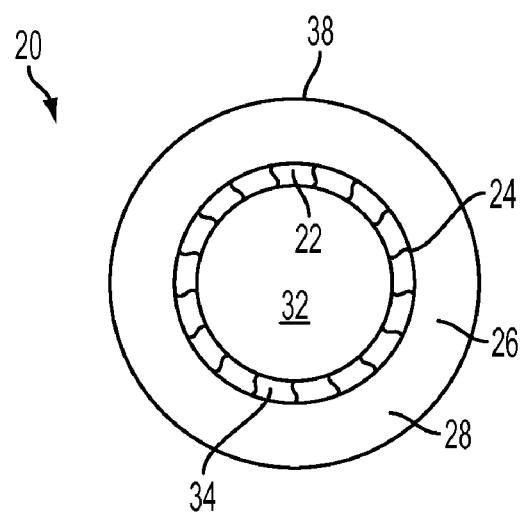
FIG. 3 is a cross-sectional view taken along line 3-3 of FIG. 2.

With additional reference to FIGS. 2 and 3, the belt cleaning system comprises a roller assembly 20 disposed below the conveyor belt 16. The roller assembly 20 includes a cylindrical roller 22 composed of a porous material 24, for example porous ceramic. The roller 22 is wrapped with a roll 26 of hydroscopic cleaning fiber 28. Cleaning liquid 30 supplied to the interior 32 of the roller 22 travels through the pores 24 of the roller wall 34 to wet the roll 26 of cleaning fiber 28. The roller assembly 20 is rotatably mounted by bearings 36 such that the outer surface 38 of the roll 26 contacts and rotates against the conveyor belt surface 18, whereby the wet cleaning fiber 28 continuously scrubs debris 8 from the conveyor belt surface 18. A drive system 40 may rotate the roller assembly 20 in the same direction or the opposite direction as the conveyor belt 16 rotates.

The cleaning liquid 30 is continuously delivered to the roller assembly 20 from a cleaning liquid reservoir 42 via a supply line 44. The cleaning liquid 30 may be gravity fed to the roller assembly 20, or forced from cleaning liquid supply 42 by pressurizing the cleaning liquid supply 42 or using a pump 46 in the supply line 44. A self-cleaning mechanism is incorporated by providing a greater flow of the cleaning liquid 30 to the roller assembly 20 than is required for cleaning the conveyor belt 16. The excess cleaning liquid flow 48 pushes debris 8 embedded within the cleaning fiber 28 to the outer surface 38 of the roll 26. This debris 8, and other debris 8 disposed on the outer surface 38 of the roll 26, are washed from the outer surface 38 of the roll 26 by the excess cleaning liquid flow 48. A sump 50 positioned below the roller assembly 20 collects the excess cleaning liquid flow 48 as it drips from the roller assembly 20. The cleaning liquid 30 collected by the sump 50 may be returned to the cleaning liquid supply 42 after passing through a filter 52 to remove debris 8.

Figure 4:
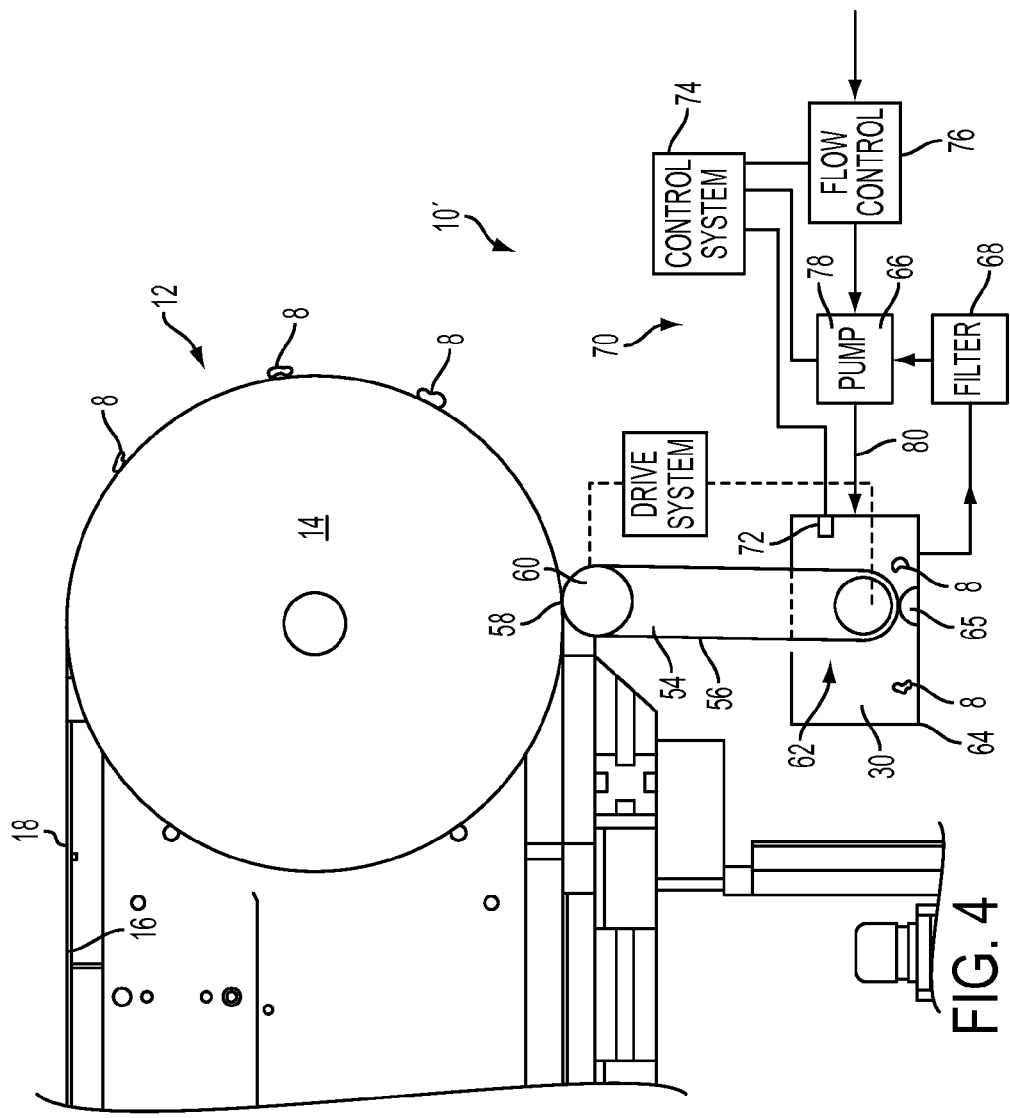
FIG. 4 is a schematic view of a second embodiment of a belt cleaning system in accordance with the present disclosure installed on a conveyor.

With reference to FIG. 4, a second embodiment of the belt cleaning system 10' includes a continuous loop 54 of cleaning web 56 composed of hydroscopic cloth or fiber. The proximal end 58 of the cleaning web loop 54 is pressed into contact with the surface 18 of the conveyor belt 16, generally from underneath the conveyor belt 16. An applicator 60 biases the cleaning web 56 into contact with the conveyor belt surface 18. The applicator 60 may be a rotating porous roll, such as a foam roll, or other spring loaded flexible surface element. The distal end portion 62 of the cleaning web loop 54 is positioned in a tank 64 containing a cleaning liquid 30, where the cleaning liquid 30 disposed in the tank 64 replenishes the cleaning liquid 30 carried in the cleaning web loop 54, ensuring that the cleaning web 56 is properly wetted. The cleaning liquid 30 disposed in the tank 64 also rinses debris 8 from the cleaning web loop 54. A cleaning device 65, such as a pressurized spray cleaner, a pressurized porous roller, a rotating brush roller, or a scrub brush, may be positioned within the tank 64 to scrub debris 8 from the conveyor belt surface 18.

Accumulated debris 8 may be removed from the cleaning liquid 30 by using a pump 66 to circulate the tank cleaning liquid 30 through a filter 68. A tank level control system 70 may be used to maintain a sufficient level of cleaning liquid 30 in the tank 64 to ensure that the distal end portion 62 of the cleaning web loop 54 is properly submerged. A liquid level detector 72 transmits a signal corresponding to the level of cleaning liquid 30 in the tank 64 to a control system controller 74. When the level of cleaning liquid 30 in the tank 64 falls to a predetermined level, the control system controller 74 operates a flow control device 76, such as a valve, to allow new cleaning liquid 30 to enter the tank 64. The control system controller 74 may also start a pump 78 in the supply line 80 to facilitate flow of the cleaning liquid 30.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:
1. A belt cleaning system to clean a conveyor belt having a carrier surface, the system comprising:
  a roller assembly including
    a cleaning web comprising a roll of cleaning fibers comprising a hydroscopic material, and
    a roller adapted to bias the cleaning web into rotating contact with the conveyor belt carrier surface; and
  a liquid supply subsystem providing a cleaning liquid to the cleaning web, the liquid supply subsystem including:
    a cleaning liquid reservoir,
    a supply line connecting the reservoir and the roller inner cavity, and
    a pump disposed in the supply line, the pump providing an excess cleaning liquid flow to push debris embedded within the roll of cleaning fibers to an outer surface of the cleaning web.

2. The belt cleaning system of claim 1 wherein:
  the roller is a cylinder comprising a porous material, the roller having an outer surface and defining an inner cavity; and
  the cleaning web is wrapped around the outer surface of the roller.

3. The belt cleaning system of claim 2 wherein the roller is composed of a porous ceramic material.

4. The belt cleaning system of claim 2 further comprising a drive system to rotate the roller and cleaning web.

5. The belt cleaning system of claim 2 wherein the liquid supply subsystem is in fluid communication with the roller inner cavity, the cleaning liquid traveling through roller to wet the cleaning web.

6. The belt cleaning system of claim 5 wherein the liquid supply subsystem also includes:
  a sump disposed below the roller assembly; and
  a filter in fluid communication with the sump and the reservoir.

7. A belt cleaning system to clean a conveyor belt having a carrier surface, the system comprising:
  a roller assembly including
    a cleaning web comprising a hydroscopic material, the cleaning web being a continuous loop having proximal and distal end portions, and
    a roller disposed in the proximal end portion of the cleaning web loop, the roller being adapted to bias the cleaning web into rotating contact with the conveyor belt carrier surface; and
  a liquid supply subsystem providing a cleaning liquid to the cleaning web the liquid supply subsystem including a cleaning liquid reservoir adapted to contain the cleaning liquid,
  wherein the distal end portion of the cleaning web loop is disposed in the cleaning liquid reservoir.

8. The belt cleaning system of claim 7 wherein the roller comprises a rotating porous roll adapted to bias a proximal end of the cleaning web into contact with the conveyor belt carrier surface.

9. The belt cleaning system of claim 7 wherein the liquid supply subsystem also includes a cleaning device disposed in the cleaning liquid reservoir, the cleaning device removing debris from the cleaning web.

10. The belt cleaning system of claim 9 wherein the cleaning device is selected from a pressurized spray cleaner, a pressurized porous roller, a rotating brush roller, and a scrub brush.

11. The belt cleaning system of claim 9 wherein the liquid supply subsystem further includes a pump and a filter in fluid communication with the cleaning liquid reservoir, the pump pumping a flow of the cleaning liquid through the filter to remove debris from the cleaning liquid.

12. The belt cleaning system of claim 11 further comprising a reservoir level control system including:
  a reservoir liquid level detector;
  a flow control device adapted to selectively fill the reservoir; and
  a controller in communication with the reservoir liquid level detector and the flow control device;

wherein the controller operates the flow control device to fill the reservoir when the cleaning liquid in the reservoir falls to a predetermined level.

13. The belt cleaning system of claim 12 wherein the controller is also in communication with the liquid supply subsystem pump.

14. A belt cleaning system to clean a conveyor belt having a carrier surface, the system comprising:
   a roller assembly including
      a cleaning web comprising a continuous loop of hydroscopic material having proximal and distal end portions, and
      an applicator disposed in the proximal end portion of the cleaning web loop,
   the applicator being adapted to bias the cleaning web into contact with the conveyor belt carrier surface; and
   a liquid supply subsystem including
      a cleaning liquid reservoir adapted to contain a cleaning liquid, the distal end portion of the cleaning web loop being disposed in the cleaning liquid reservoir,
      a pump, and a filter in fluid communication with the cleaning liquid reservoir,
   wherein the pump pumps a flow of the cleaning liquid through the filter to remove debris from the cleaning liquid.

15. The belt cleaning system of claim 14 wherein the liquid supply subsystem also includes a cleaning device disposed in the cleaning liquid reservoir, the cleaning device removing debris from the cleaning web.

16. The belt cleaning system of claim 15 further comprising a reservoir level control system including:
   a reservoir liquid level detector;
   a flow control device adapted to selectively fill the reservoir; and
   a controller in communication with the reservoir liquid level detector, the flow control device and the liquid supply subsystem pump;
   wherein the controller operates the flow control device to fill the reservoir when the cleaning liquid in the reservoir falls to a predetermined level.

* * * * *